United States Patent [19]

Goodwin

[11] 3,898,388

[45] Aug. 5, 1975

[54] PHASE INVERSION SYNCHRONIZATION

[75] Inventor: R. Wendell Goodwin, Westport, Conn.

[73] Assignee: United Aircraft Corporation, East Hartford, Conn.

[22] Filed: June 21, 1974

[21] Appl. No.: 481,939

[52] U.S. Cl. ........................ 179/15 BS; 178/69.5 R

[51] Int. Cl.[2] ........................................ H04J 3/06

[58] Field of Search.................. 179/15 BS, 15 AW; 178/69.5 R

[56] References Cited

UNITED STATES PATENTS

| | | | |
|---|---|---|---|
| 3,804,985 | 7/1974 | Vax | 178/69.5 R |
| 3,826,869 | 7/1974 | Matsuo | 179/15 BS |

FOREIGN PATENTS OR APPLICATIONS

| | | | |
|---|---|---|---|
| 1,192,691 | 5/1965 | Germany | 179/15 AW |

*Primary Examiner*—Ralph D. Blakeslee
*Attorney, Agent, or Firm*—M. P. Williams

[57] ABSTRACT

A frame delineating bit, in a stream of data bits from different sources in a time division multiplex system, is defined by causing a transition between states representing one and zero at a time which is 180° out of phase with normal data transition times, only in the case where adjacent data bits of the highest order channel and the lowest order channel have different data delineating states, thereby avoiding any increase in bandwidth to accommodate the framing bit.

6 Claims, 7 Drawing Figures

Fig. 1
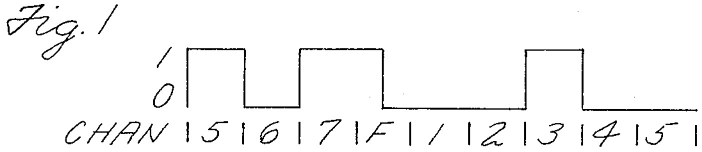
Fig. 2
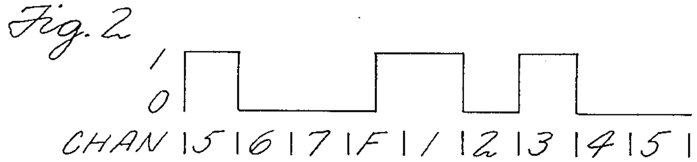
Fig. 3
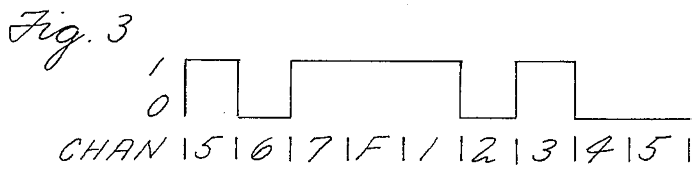
Fig 4
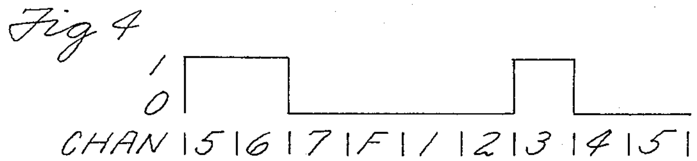
Fig. 7 RECIEVER
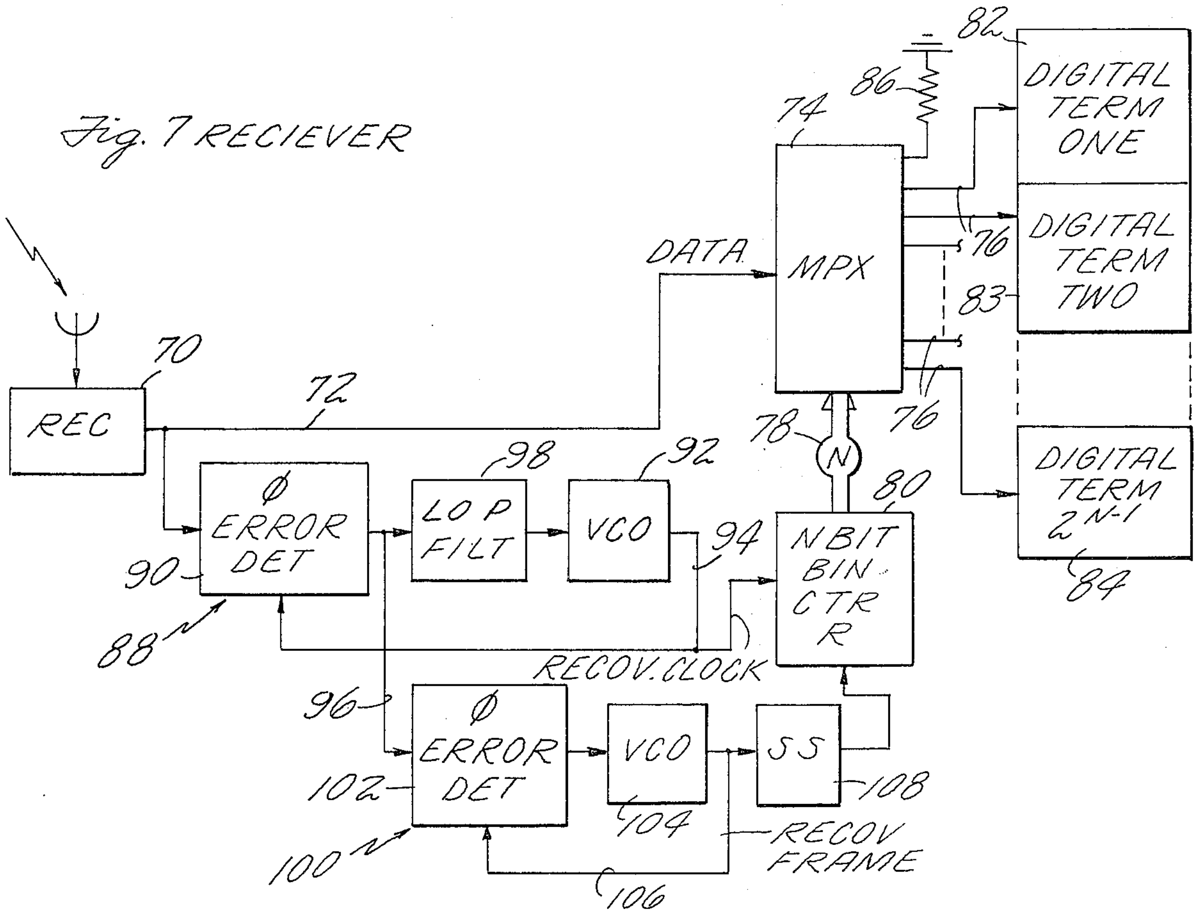

Fig. 5 TRANSMITTER
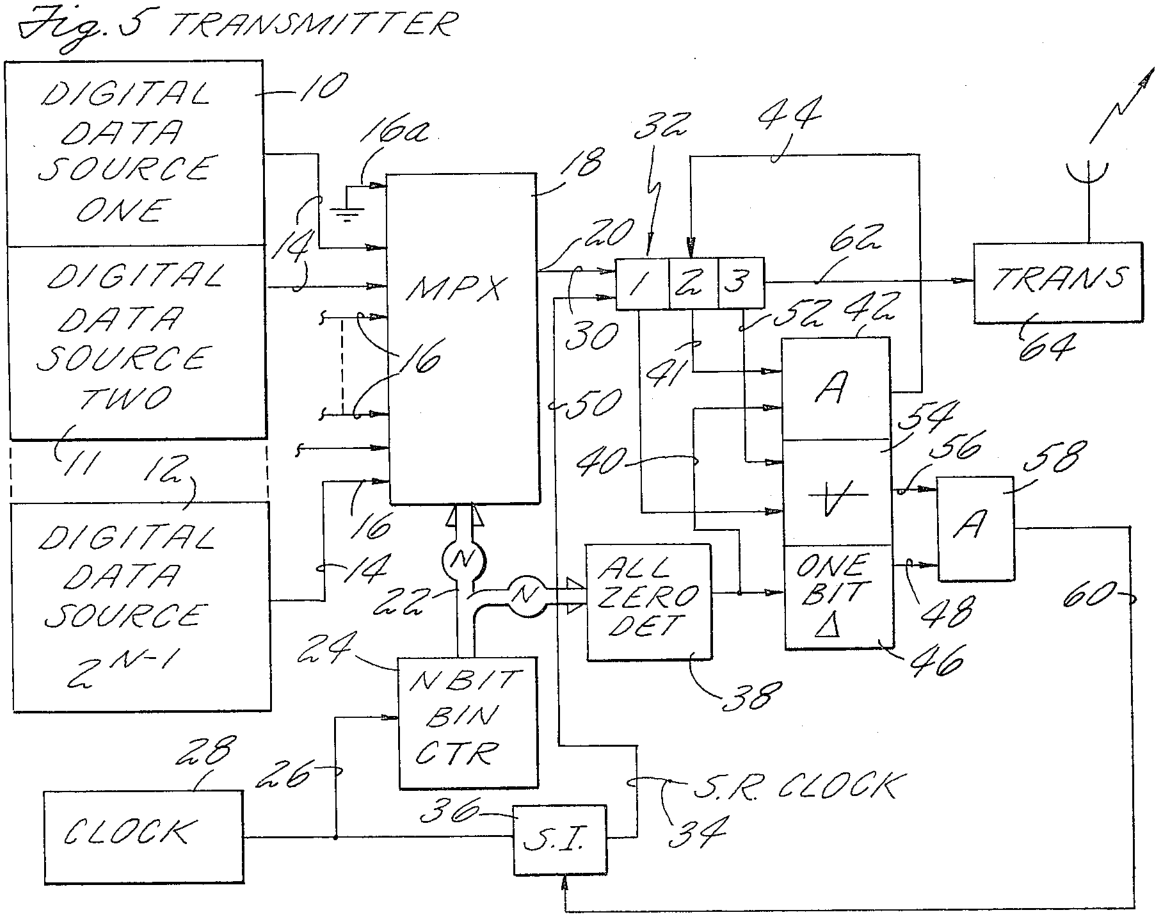
Fig. 6
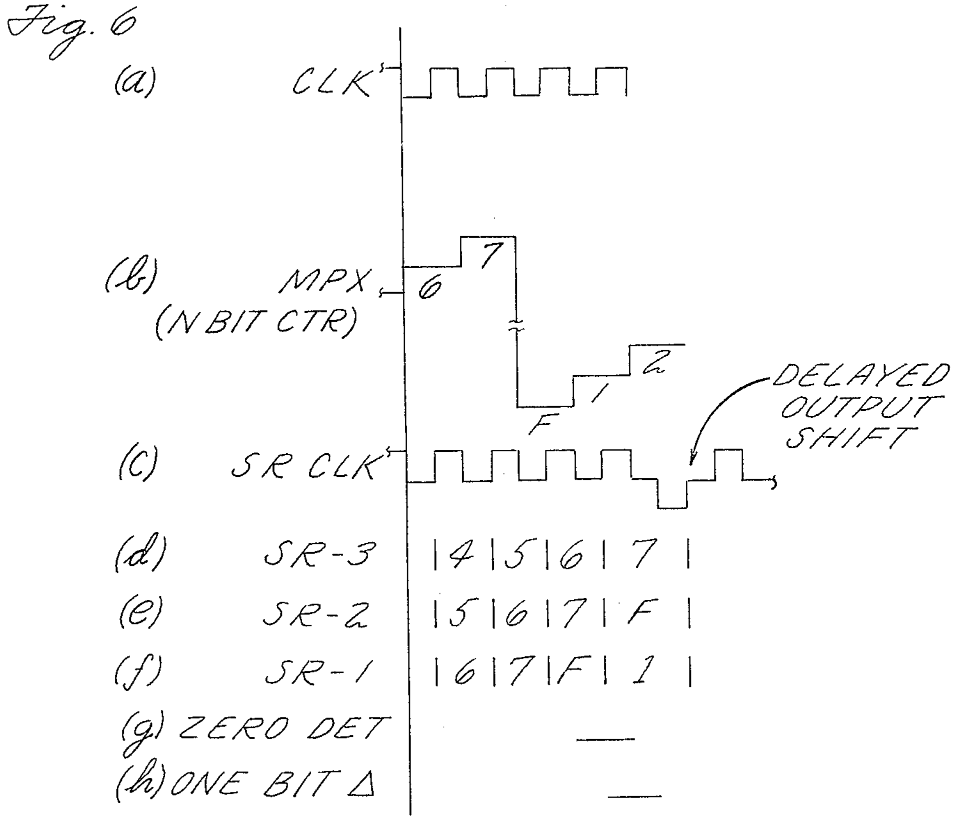

PHASE INVERSION SYNCHRONIZATION

BACKGROUND OF THE INVENTION

1. Field of the Invention

The utilization of bit-interleaved, time division multiplexing is well known. In such a case, each bit time in a stream of data relates to a different data source than the bit times prior and subsequent thereto the stream of data bits. The allocation of bit times to data sources repeats cyclically in groups called frames. For each complete frame of bits, each data source is allocated a time to send one bit, that time being the same relative time in the particular frame of bits as is allocated to it in all other frames of bits.

In order to determine when the framing time is, and therefore to be able to decipher, at the receiving end, which bits should be associated with which data sources, it is desirable to send some special code to delineate the start or end of at least representative (if not all) frames of data bits which are sent.

2. Description of the Prior Art

As is known, any framing bit (or similar synchronization information) which is sent along with the data must have something unique about it, to distinguish it from data. In the prior art, it has been known to send entire words having a configuration which is substantially improbable of appearing in any of the data channels. However, even in the case of wordinterleaved serial time division multiplexing, and particularly in the case of bit-interleaved multiplexing, the use of code words for framing or other synchronizing requires complex digital circuitry and commensurate operating procedures which add materially to the cost, complexity, unreliability and time lost in data transmission. On the other hand, the utilization of framing bits which are of a lesser duration than data bit intervals significantly increases the bandwidth requirement, since short spikes or transitions would go unnoticed or be undiscernable amidst transmission or circuit noise without providing a significant increase in the bandwidth and/or signal-to-noise capabilities of the system.

SUMMARY OF THE INVENTION

An object of the present invention is provision of improved synchronization for time division multiplexing.

According to the present invention, a synchronizing bit is delineated by a transition in the middle of a bit interval in the event that the last data bit is of a different kind than the next succeeding data bit, in a non return to zero, time division multiplexing system.

In accordance further with the present invention, the framing bit is recovered at the reception end of the time division multiplexing system by means of a pair of phaselocked loops, one operating at the data bit rate frequency and the other operating at the framing rate frequency, the out of phase transition (signifying a framing bit) being substantially blocked from the data bit rate frequency determining element by means of a low pass filter.

The present invention permits inserting a framing bit in a stream of data bits in a time division multiplexing system, without any need for increasing of the bandwidth of the system.

Other objects, features and advantages of the present invention will become more apparent in the light of the following detailed description of preferred embodiments thereof, as illustrated in the accompanying drawing.

BRIEF DESCRIPTION OF THE DRAWING

FIGS. 1-4 are timing diagrams illustrative of the operation of the present invention;

FIG. 5 is a schematic block diagram of transmitter circuitry employing the present invention;

FIG. 6 is a timing diagram relating to the operation of FIG. 5; and

FIG. 7 is a schematic block diagram of receiver circuitry employing the present invention.

DESCRIPTION OF THE PREFERRED EMBODIMENT

The present invention is disclosed in an embodiment which contemplates the utilization of bit-interleaved, time division multiplexing. In such a case, each bit is proceeded by a bit from a different data source and is succeeded by a bit from a different data source. The allocation of bit times to the data sources recurs cyclically such that each transmits in the same relative portion of a cycle, which cycle is herein referred to as a frame, with a framing bit being allocated to a time period which falls between the bit period of a highest-ordered channel and the bit period of a lowest-ordered channel in the frame. However, it should be appreciated that the framing bit could be inserted between the last bit of a word of bits relating to the highest-ordered channel and the first bit of a word of bits relating to the lowest-ordered channel, in the case where word-interleaving is desired to be used. In the present invention, advantage is taken of the fact that the utilization of a phase-locked loop permits correction of the phase-locked loop something on the order of 50% of the time with no degradation of system operation. In other words, if the phase-locked loop is brought into correction periodically (such as every 2 or 3 cycles) it will maintain clocking rates which are sufficiently accurate so as to recover the data content of an incoming stream of digital data. The present invention also takes advantage of non return to zero manifestation of data significance, as is illustrated in FIGS. 1-4. FIG. 1 illustrates the case where the data bits for the highest-ordered channel (which in the present embodiment is taken to be channel 7) is a ONE, and a lowest-ordered channel, channel 1, has a ZERO to be transmitted. In this case, there must be a transition from the ONE to the ZERO somewhere between the channel 7 bit time and the start of the channel 1 bit time. In accordance with the invention, this transition is caused to fall in the middle of the framing bit (designated F in FIGS. 1—4), which it utilized and recognized at the receiving end to represent the framing bit, since its transition occurs 180° out of phase with data bit transitions. Similarly, FIG. 2 illustrates the case where channel 7 has a ZERO in it and channel 1 has a ONE in it; in this instance, the transition from ZERO to ONE is similarly timed to occur in the middle of the framing bit, F. In the case where the data bit of the highest-ordered channnel in one frame is the same as the data bit in the lowest-ordered channel of a succeeding frame, no transition is required in order to accommodate the data content of these two data bit times, and the present invention permits passage of these data bits without any transition whatsoever during framing time, as is illustrated for the case of ONE in FIG. 3 and as is illustrated in the case of ZERO in FIG. 4.

Referring now to FIG. 5, an exemplary embodiment of the invention is illustrated as having a plurality of digital data sources 10–12 designated as ONE, TWO, . . . $2^{N-1}$. The data output of these data sources on a plurality of related lines 14 are applied to corresponding inputs 16 of a well known multiplexer 18. The multiplexer 18 has a single output 20 which is successively connected to different ones of its inputs 16 in response to a digital code word applied on a trunk of N lines 22 from an N bit binary counter 24, which is advanced by clock signals on a line 26 from a clock circuit 28 operating at the data bit rate of the system.

It is assumed that the counter 24 is advanced by negative transitions of the clock, which causes the multiplexer to advance from inputs 16 relating to one source to a succeeding input relating to a higher-ordered source, as is shown in illustration (b) of FIG. 6. This presents the data bits of the successive sources at the output of the multiplexer 20 over a line 30 to the input of a three bit shift register 32 which is strobed by a shift register clock signal on a line 34 from a selective inverter 36 that is responsive to the clock signals on the line 26. Assuming that the shift register 32 is shifted by positive transitions of the shift register clock signal 34 (which are generally in phase with the clock signal as is shown in illustrations (a) and (c) of FIG. 6), data bits relating to successively higher-ordered ones of the sources 10–12 (which are designated 4–7 and F, in illustrations (d) – (f) of FIG. 6) will be shifted successively through the shift register 32.

In the present embodiment, the framing bit time is designated as channel 0 (though referred to as channel F) and the multiplexer 20 connects the related one of its inputs 16*a* (which may be connected to ground so as to represent a data bit ZERO) to the multiplexer output 20 in response to the N-bit binary counter 24 being set at all zeros. This fact is sensed by an all zeros detector 38, the output of which on a line 40 indicates that the framing bit has just been established in stage 1 of the shift register 32, as shown in illustrations (f) and (g), FIG. 6. At this time, the output of stage 2 of the shift register on a line 41 is sampled by an and circuit 42 such that if stage 2 were set to a ONE, stage 2 is then forced into the ONE state for the duration of the all zero signal on the line 40 as shown at the bottom of FIG. 7. Thus, if the seventh channel has, in fact, had a ZERO in it, the and circuit 42 will not operate so that there will be no forcing of the second stage of the shift register, and the next succeeding positive transition will cause the ZERO in the first stage to be transferred into the second stage. On the other hand, if there is a ONE in the second stage of the shift register during the all zero signal time, the second stage will be forced to a ONE so that upon the next succeeding positive transition (which occurs in the middle of the all zero detection time), the ZERO in stage one is not transferred to stage 2 since stage 2 is continually forced to a one. In this manner, stage 2 (when representing the framing channel) is always made to correspond to the setting that it had with respect to channel 7. In other words, once the data and framing bits are aligned in the shift registers 32 such that channel 7 is in the third stage of the shift register 32, channel 1 is in the first stage of the shift register and the framing channel is in the second stage of the shift register, the second and third stages of the shift register are set identically.

The output of the all zero detector 38 on line 40 is fed also through a one bit delay circuit 46, which may simply comprise a suitably adjusted monostable multivibrator, or may comprise suitable bistable devices which may be operated in response to the clock signals on the line 26. In any event, the output of the one bit delay circuit 46 on a line 48 is the same as the all zero detector output 38, but delayed one bit time therefrom, as is shown in illustration (h) of FIG. 6. The first and third stage outputs of the shift registers 32 on lines 50, 52 are compared by an exclusive or circuit 54 such that if the two stages are set the same (either both ONES as in FIG. 3 or both ZEROS as in FIG. 4), there will be no output on a line 56 from the exclusive or circuit 54. But if one of the stages is a ONE and the other of the stages is a ZERO, as is illustrated in either FIG. 1 or FIG. 2, then there will be an output on a line 56 during the period of time of the output on a line 48 from the one bit delay circuit, such that an and circuit 58 will provide an inversion signal on a line 60 to cause the selective inverter 36 to invert any output so that the shift register clock signal on a line 34 will be a zero or a negative value as is shown in illustration (c) of FIG. 6, instead of being a zero or a positive value. Because of the fact that the zero-level of the shift register clock is not significant in shifting the shift register 32, it is immaterial if there is a small amount of variation in the timing of the inversion, so long as it spans the normally positive timing of the clock signal and causes it to invert to become a negative output as illustrated in the middle of FIG. 6. In order to avoid any possibility of ambiguous operation due to circuit races, it is preferred that the one bit delay circuit 46 provide a delay slightly in excess of one bit so that the delayed output shift will occur with assurance, all as is well known in the art, and as is briefly illustrated at the bottom of FIG. 6.

The output of the shift register 32 is provided on a line 62 to transmitter circuitry 64, which may either be a radio type of transmitter utilizing frequency shift keying, or ordinary line communication equipment, or any other form of transmitter or transmission which can delineate between ONE and ZERO data bits and do so in response to timing provided by the output of the shift register 32.

Since the shift register is assumed in this embodiment to shift only in response to positive transitions, the normal shifting of the framing bit into the third position of the shift register, and the channel 7 bit out of the register to the transmitter will not occur at the same time as it would normally, but will occur only one-half bit-time later as is indicated by the legend "delayed output shift" in FIG. 6. Thus, in accordance with a first aspect illustrated in FIG. 5, the present invention causes the framing bit to be the same as the next preceding data bit and thereafter causes the transition from a ONE to a ZERO, or from a ZERO to a ONE to occur one-half bit-time later than normal in the case where a data transition is required.

In order to recover the framing bit information in receiver apparatus of the type illustrated in FIG. 7, the data is recovered from the transmitting medium by a receiver 70 which provides data bits on a line 72 and supplies them to a multiplexer 74. The multiplexer 74 is the same as the multiplexer 18 except that the flow of data therethrough is reversed, as is well known in the art. The multiplexer connects the line 72 with a plurality of output lines 76, in sequence, in response in digital codes provided on a trunk of N lines 78 from an N-bit binary counter 80, of the same sort as is described hereinbefore with respect to FIG. 5. Provided the counter 80 is operated at the correct rate, and with proper synchronism with respect to the counter 24 of FIG. 5, the data on a line 72 will be sorted out amongst a plurality of digital terminals 82–84 designated ONE, TWO . . . $2^{N-1}$, so as to correspond to the data provided to the multiplexer 18 by the sources 10–12, respectively. The lowest-ordered output (channel 0) of the multiplexer 74 may be simply terminated, as is illustrated by a grounded resistor 86, since this output of the multiplexer is connected to the data line 72 during a period of time which relates to the framing bit channel time.

In order to create the proper synchronism of the counter 80 with the counter 24, the data line 72 is connected to a clock phase-locked loop 88, which is conventional in nature in that it includes a phase error detector 90, the output of which is applied to a voltage controlled oscillator 92, the output of which on a line 94 constitutes the recovered clock signals, and which is applied to the reference input of the phase error detector 90. Whenever the incoming data 72 is at the same phase as the VCO 94, the phase error detector 90 provides no DC output on a line 96. However, any differences of phase will supply an output signal through a low pass filter 98 to the VCO 92 so as to correct its frequency. By proper choice of the VCO sensitivity, the drift due to strings of like data bits can be kept sufficiently small (eg., ±90° of phase) that unambiguous sampling of data (nominally near 180°) can be maintained. The output of the phase error detector 90 on the line 96 is also supplied to a frame phase-locked loop 100, which is conventional in nature and includes a phase error detector 102 feeding a VCO 104, the output of which is fed back as the phase reference input to the phase error detector 102. Since, as described with respect to FIG. 5 hereinbefore, a framing bit, whenever one actually occurs, comprises a transition which is 180° out of phase with the data bits, it will cause a large output from the phase error detector 90; however, this abrupt change, which is extremely temporary in nature, is integrated on a low pass filter 98, and since the VCO 92 responds to the long term average of all the signals from the phase error detector 90, this abrupt, large signal does not appreciably affect the VCO 92. On the other hand, this output is applied without filtering to the phase error detector 102 which controls the VCO 104 operating at a much lower frequency (by the ratio of the number of digital data sources 10–12), so that these output signals do affect the phase error detector 102 and therefore do control the VCO 104 so as to cause it to operate at the framing rate. It should be understood that it is necessary not only to have the VCO 104 operating at a rate which is the same fraction of the rate of the VCO 92 as on a number of digital data sources, but that it sense the particular one of the bit times which is allocated to the framing rate in order to sort out which of the data bits came from which of the data sources. By causing the VCO to be completely phase locked to the delayed shift of the output of the shift register 32 (FIG. 5), it similarly causes the binary counter 80 to be guaranteed to be forced to all zeros (designating the framing bit time) in synchronism with the operation of the transmitter in FIG. 5. If forced resets of a counter are utilized, then circuitry to provide a timing signal of a suitable duration may be provided, as is illustrated by a single shot 108. On the other hand, if positive and negative transitions are utilized to reset the binary counter 80 to an all zeros condition, then timing circuitry such as the single shot 108 is not necessary.

The N-bit binary counter 80 is advanced by the recovered clock signals on the line 94, such that the multiplexer 74 is advanced in synchronism with the advancement of the multiplexer 18 (FIG. 5).

Thus, the receiver circuitry of FIG. 7 recovers the clock by using a phase-locked loop which is insensitive to large phase errors (as results from the delayed shifting of the framing bit) and recovers the framing bit by using phase-locked loop which is sensitive to those large transitions. It is to be noted that the framing phase-locked loop 100 will respond in some fashion to outputs of the phase error detector 90 as a result of each of the data bit transitions, but these effects will be minor in contrast with the effect of the delayed shift during the framing bit.

Thus, the present invention has been described in an embodiment which utilizes non return to zero data and causes the transitions between unlike data bits in the center of framing time, together with phase-locked loops to recover the framing bit, thereby to synchronize the receiver to a transmitter in a time division multiplexer, without any requirement of an increase in bandwidth. As described briefly hereinbefore, it should be understood that the present invention may even be utilized, by the addition of word counters, in a system which is a word-interleaved system rather than bit-interleaved, since the framing transition can be provided in the middle of a framing time which falls between the last bit to be transmitted of the highestordered channel of one frame and the first bit to be transmitted of the lowest-ordered channel of a second frame, even though there be additional bits in the words being transmitted. In which case, however, the disparity in the frequency of the framing phase locked-loop 100 will be as many times lesser than that of the data phase-locked loop as there are number of bits in a word.

Recovery of the framing bit may also be done by recognizing transitions which are not closely related in time to the recovered clock, or in other fashions.

Although the invention has been shown and described with respect to a preferred embodiment thereof, it should be understood by those skilled in the art that the foregoing and various changes, omissions and additions may be made therein without departing from the spirit and the scope of the invention.

Having thus described the typical embodiment of my invention, that which I claim as new and desire to secure by Letters Patent of the United States is:

1. In the method of synchronizing a time division multiplexing system of the type in which data manifestations from a plurality of sources are interleaved with one another in streams of binary non-return to zero manifestations of two different, related kinds respectively representing binary ONEs and ZEROs, in cyclically repetitive sequential frames, each frame comprising a sequence of bit times, the step of:

providing a transition from a data manifestation of one kind to a data manifestation of the opposite kind at substantially the center of a bit time having the same position in the sequence of bit times within each frame, on the condition however that the data manifestation next preceding said bit time in said sequence is of a kind opposite to that of the data manifestation next succeeding said bit time in said sequence.

2. In a time division multiplexing system of the type in which data manifestations from a plurality of sources are interleaved with one another in streams of manifestations comprising a plurality of cyclically repetitive sequential frames, the data being represented by manifestations of two different, related kinds respectively representing binary ONEs and ZEROs, phase inversion synchronization apparatus comprising:

means for cyclically presenting successive frames of data manifestations, in binary non return to zero format, each of said frames of data manifestations including a sequence of bit times, one of the bit times of each of said frames being designated as a framing bit time; and selective transition means responsive to data bit manifestations of opposite kinds in bit times immediately preceding and immediately succeeding each of said framing bit times in said stream for causing a selective transition from one manifestation kind to the other manifestation kind at a time substantially centrally disposed in the related one of said framing bit times.

3. Synchronization apparatus according to claim 2 wherein said selective transition means comprises a data clock establishing data bit times, a three stage shift register operating in response to said date clock, means for comparing the data manifestations in the first and third stages of said shift register and providing a delayed shift signal when said data manifestations are of opposite kinds, and means responsive to said delayed shift signal for causing the manifestation in the third stage of said shift register to be shifted out of said shift register at a time which is one-half data-bit time delayed with respect to said data clock and within one of said framing bit times.

4. Synchronization apparatus according to claim 3 wherein said selective transition means further comprises means responsive to the data content of said shift register for causing the content of the second stage of said shift register to assume the same kind of data manifestation as the content of the third stage of said shift register at a time when said second stage of said shift register corresponds with said framing bit time.

5. Synchronization apparatus according to claim 3 including a selective inverter responsive to said data clock for shifting said shift register, said selective inverter responsive to said delayed shift signal for inverting the data clock applied to said shift register.

6. A time division multiplexing system including:

transmitter apparatus comprising phase inversion synchronization apparatus according to claim 2 and means responsive thereto for transmitting data manifestations therefrom; and receiver apparatus adapted to receive transmissions from said transmitter apparatus and including a phase-locked loop responsive to said selective transition for generating framing signals synchronized therewith.

* * * * *